United States Patent
Akikuni

[11] Patent Number: 6,076,977
[45] Date of Patent: Jun. 20, 2000

[54] PHOTORECEPTACLE FOR MEASURING LIGHT

[75] Inventor: Fumio Akikuni, Tokyo, Japan

[73] Assignee: Ando Electric Co., Ltd., Tokyo, Japan

[21] Appl. No.: 09/018,378

[22] Filed: Feb. 4, 1998

[30] Foreign Application Priority Data

Feb. 17, 1997 [JP] Japan ................................ 9-048379

[51] Int. Cl.$^7$ .................................................... G02B 6/43
[52] U.S. Cl. ............................ 385/88; 385/78; 385/60; 385/70; 385/75
[58] Field of Search ........................ 385/56, 58, 60, 385/62, 66, 70, 72, 75, 76–78, 81, 88, 89, 63

[56] References Cited

U.S. PATENT DOCUMENTS

| | | | |
|---|---|---|---|
| 4,179,801 | 12/1979 | Hollis | 385/88 |
| 4,385,800 | 5/1983 | Basola et al. | 385/88 |
| 4,684,210 | 8/1987 | Matsunaga et al. | 385/88 |
| 4,798,440 | 1/1989 | Hoffer et al. | 385/88 |
| 5,333,224 | 7/1994 | Kikuchi | 385/93 |
| 5,661,834 | 8/1997 | Watanabe et al. | 385/92 |

*Primary Examiner*—Rodney Bovernick
*Assistant Examiner*—Ellen Kim
*Attorney, Agent, or Firm*—Flynn, Thiel, Boutell & Tanis, P.C.

[57] ABSTRACT

There is to provided a photoreceptacle capable of stabilizing th connection between an optical fiber connector and the photoreceptacle and of commonly using an optical fiber connector having ferrules of the same shape. A cylindrical elastic body for elastically pressing and supporting outer diameter portions of ferrules of an optical fiber connector is integrally mounted on a photoreceptacle. The photoreceptacle comprises a cylinder which is inserted into the optical fiber connector and a collar attached to a photodetector. The collar has an outer configuration not to contact adjacent ferrules of a multi-core optical fiber connector when the multi-core optical fiber connector is inserted into the photoreceptacle.

5 Claims, 2 Drawing Sheets

PHOTORECEPTACLE FOR MEASURING LIGHT

BACKGROUND OF THE INVENTION

1. Field of the Invention

When light outputted from an optical fiber connector is measured by a photodetector, a photoreceptacle capable of connecting to the optical fiber connector is mounted on the photodetector. The present invention relates to such a photoreceptacle for measuring light.

2. Prior Art

A structure of a conventional photoreceptacle will be described next with reference to FIG. 2. In FIG. 2, denoted by 1 is a photodetector, 7 is a receptacle, 8 is an adaptor, 9 is a stopper, 11 is a holder, and 12 is an optical fiber connector.

In FIG. 2, photodetector elements are incorporated in the center of the cylindrical photodetector 1. The holder 11 is secured to the photodetector 1 at its light receiving side. The photoreceptacle 7 is secured to the holder 11. The adaptor 8 is secured to the photoreceptacle 7.

The photoreceptacle 7 has a hole 7A at the center thereof into which a ferrule 12A of the optical fiber connector 12 is inserted. The hole 7A has a stepped portion at the end to which the stopper 9 is secured. The stopper 9 has a through-hole at the center through which light passes.

FIG. 2 shows a view showing a state where the optical fiber connector 12 is connected to the photoreceptacle 7. In FIG. 2, the end of the ferrule 12A is inserted into the hole 7a until it contacts the stopper 9. In FIG. 2, the ferrule 12A is inserted in the hole 7A of the photoreceptacle 7, while the cylindrical part of the adaptor 8 is inserted into a hole of a plug 12B, so that the optical fiber connector 12 is connected with the photoreceptacle 7.

In FIG. 2, the inner diameter of the hole 7A of the photoreceptacle 7 is greater than the maximum limit of the outer diameter of the ferrule 12A. Accordingly, there are cases where the optical fiber connector 12 and the photoreceptacle 7 are unstably connected with each other. In case of FIG. 2, if the shape of the plug 12B is different, a different adaptor 8 corresponding to the shape of the plug 12B must be prepared even when the outer diameter of the ferrule 12A is the same as the inner diameter of the hole 7A of the photoreceptacle 7.

Further, there is a problem that the photoreceptacle in a parallel arrangement such as "the two-core optical fiber connector" or "the F08 type two-core optical fiber connector", respectively stipulated by JIS C5976 or C5977, or the FDDI type optical fiber connector, cannot be used commonly with the photoreceptacle in the arrangement shown in FIG. 2 although the shape of the ferrule is the same.

SUMMARY OF THE INVENTION

It is an object of the present invention to provide a photoreceptacle which can be used commonly for an optical fiber connector having the same ferrule shape, stabilizing the state of connection between the optical fiber connector and the photoreceptacle.

To achieve the above object, in a first aspect of the present invention, a cylindrical elastic body 4 is integrally mounted on a photoreceptacle 3 for elastically pressing and supporting the outer diameter portions of the ferrules 2A of an optical fiber connector 2.

In a second aspect of the present invention, the photoreceptacle 3 comprises a cylinder 3A which is inserted into the optical fiber connector 2 and a collar 3B attached to the photodetector 1, wherein the optical fiber connector is formed of a multi-core fiber connector and the collar 3B has an outer configuration not to contact adjacent ferrules 2A of the optical fiber connector 2 when the multi-core fiber connector 2 is inserted into the photoreceptacle 3.

PREFERRED EMBODIMENT OF THE INVENTION

Next, a photoreceptacle according to a preferred embodiment of the present invention will be described with reference to the attached drawings. FIGS. 1(A) and 1(B) are views respectively showing a structure of a photoreceptacle according to a preferred embodiment of the present invention, wherein FIG. 1(A) shows a state of connection between the optical fiber connector and the photoreceptacle, and FIG. 1(B) shows a view as seen from the arrow A.

Figure 1:
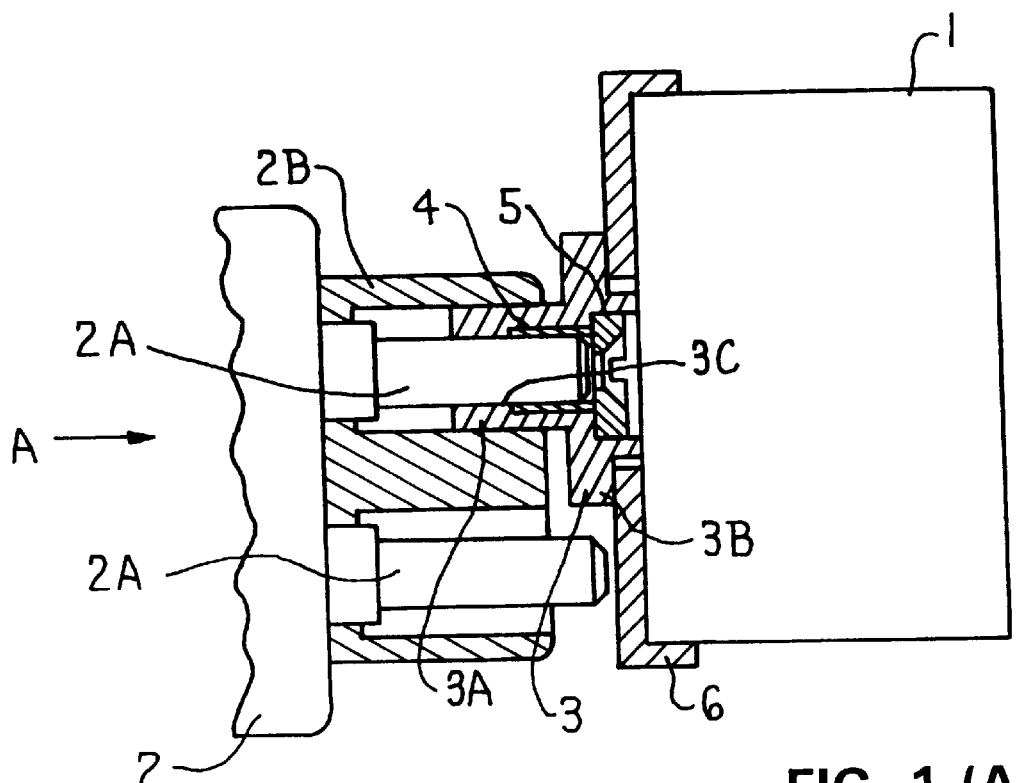
FIGS. 1(A) and 1(B) are views each showing a structure of a photoreceptacle according to a preferred embodiment of the present invention.
Figure 1:
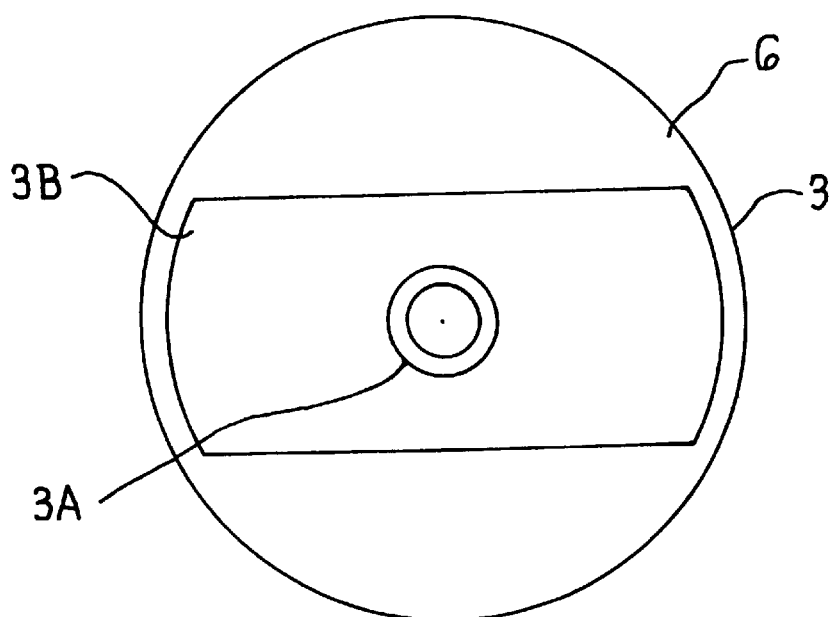
Figure 2:
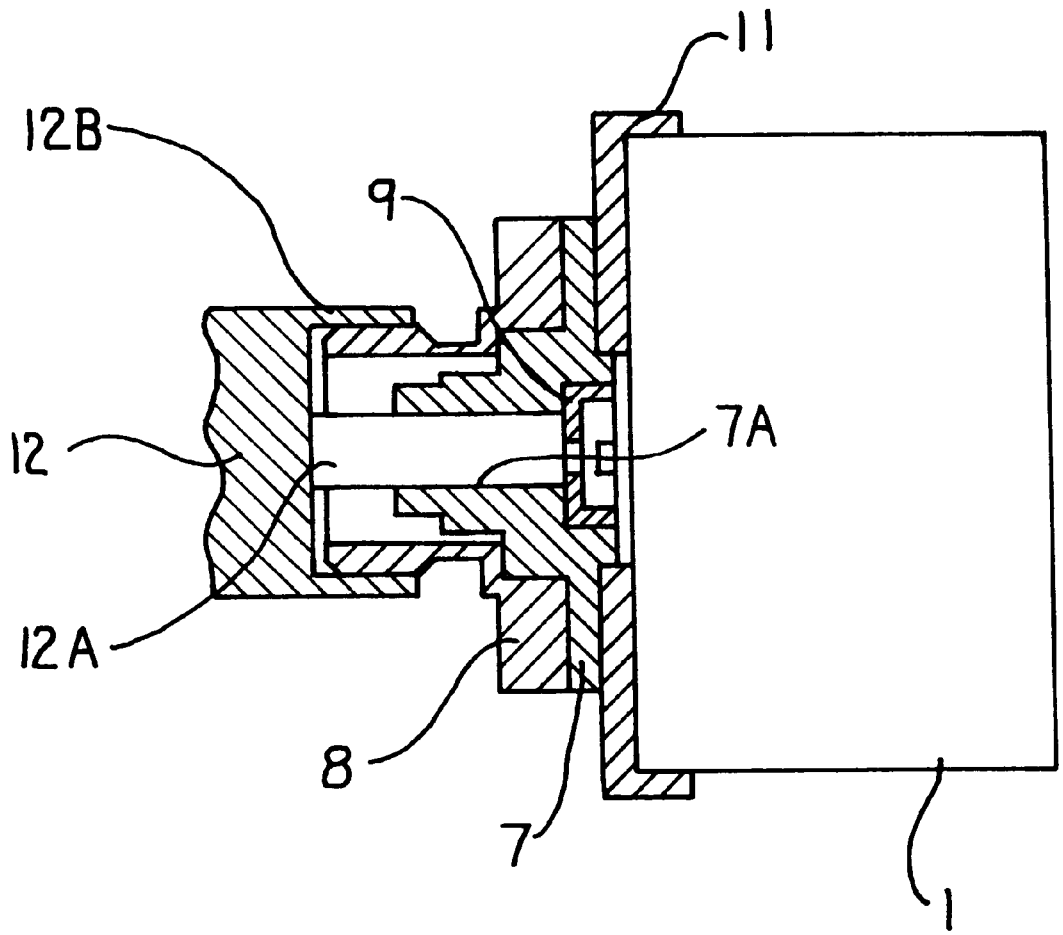
FIG. 2 is a view showing a structure of a conventional photo receptacle according to a prior art.

In FIG. 1, denoted by 1 is a photodetector like FIG. 2, and 2 is a two-core optical fiber connector (hereinafter referred to as a photo connector). Denoted by 3 is a photoreceptacle, 4 is a cylindrical elastic body, 5 is a stopper, and 6 is a holder.

In FIG. 1(A), the holder 6 having an aperture fixed or secured to the photodetector 1 at its photo detecting side. The photoreceptacle 3 is fixed to the holder 6. The photoreceptacle 3 has a hole or aperture 3C at the center thereof through which one of ferrules 2A of the photo connector 2 is inserted. The hole 3C has a stepped portion at the end thereof to which the stopper 5 is fixed or secured. The stopper 5 has a throughhole or aperture at the center thereof through which light passes.

The cylindrical elastic body 4 is formed of a material, for example, an elastic synthetic resin. The cylindrical elastic body 4 is mounted or secured inside the hole 3C of an inner surface of a cylinder 3A of the photoreceptacle 3. As shown in FIG. 1(A), the cylindrical elastic body 4 extends outwardly from the fiber connector side of the collar 3B a distance less than the extent of the cylinder 3A. The hollow cylinder 3A has a first diameter and includes a step at an outward end as shown in FIG. 1. The elastic body 4 is mounted along a portion of the cylinder 3A having a second diameter greater than the first diameter. The inner surface of the cylindrical elastic body 4 is formed so as to elastically press the outer peripheral surface of each ferrule 2A.

FIG. 1(A) is a view showing a state where the photo connector 2 is connected to the photoreceptacle 3. In FIG. 1(A), the ferrule 2A is inserted into the hole 3C of the photoreceptacle 3 until it contacts the stopper 5. In FIG. 1(A), since the ferrule 2A is inserted into the hole 3C of the photoreceptacle 3, and further the cylindrical elastic body 4 elastically presses and supports the ferrule 2A, the connection between the photo connector 2 and the photoreceptacle 3 is stabilized, and the maximum limit of the outer diameter of the ferrule 2A can be absorbed.

As shown in FIG. 1(A), the photoreceptacle 3 comprises the cylinder 3A having an aperture which is inserted into the photo connector 2 and the collar 3B having an aperture attached to the photodetector 1. The cylinder 3A has a small outer diameter to the extent not to contact the inner surface of the plug 2B of the photo connector 2.

As shown in FIG. 1(B), the collar 3B has a disk-like shape with a part of the circular arc thereof being cut off, and spaced from the plug 2B so as not to contact the adjacent ferrule 2A. As shown in FIG. 1(A), the collar 3B has no projections extending outwardly from the optical fiber connector side except for the cylinder 3A.

As shown in FIGS. 1(A) and 1(B), the cylinder 3A, the collar 3B, the hole 3C and the stopper 5 have openings or apertures that are all arranged or aligned to pass light to the photodetector and have a common axis.

Although in the preferred embodiment shown in FIG. 1, the two-core fiber connector is exemplified, the photoreceptacle according to the present invention can be used commonly for a single-core optical fiber connector as far as the shape of the ferrule is the same.

The photoreceptacle according to the present invention can stabilize the connection between the optical fiber connector and the photoreceptacle since the cylindrical elastic body is integrally mounted on the photoreceptacle for elastically pressing and supporting the outer diameter portion of the ferrule of the optical fiber connector.

Further, since the photoreceptacle according to the present invention has the collar with an outer configuration not to contact adjacent ferrules of a multi-core optical fiber connector, photo connectors having ferrules of the same shape can be used commonly.

What is claimed is:

1. A combination comprising:

a photodetector;

an optical fiber connector having at least two ferrules projecting outwardly therefrom and disposed in sidewardly spaced relationship from one another;

a photoreceptacle positioned between and connecting said photodetector and said optical fiber connector, said photoreceptacle including:

a transversely extending plate-shaped collar having a width dimension which is substantially smaller than the transversely-extending length dimension, an annular stepped part fixed to said collar and projecting outwardly from one side thereof in a direction toward said photodetector, an elongate hollow cylinder fixed to said collar and projecting outwardly from the other side thereof toward said optical fiber connector, an aperture extending through said hollow cylinder, said collar and said annular stepped part along a common axis, a hollow cylindrical elastic body secured to an inner surface of said hollow cylinder and having an opening therethrough which extends along the common axis, said elastic body being elongated axially over at least part of the length of said hollow cylinder;

a holder positioned generally between said photodetector and said collar and mounted on said photodetector, said holder being disposed in surrounding relationship to said annular stepped part and having an opening therethrough into which said annular stepped part projects;

one of said ferrules being inserted into said aperture so as to be disposed within the opening of said elastic body and pressingly engaged and supported by said elastic body, whereby said ferrule is permitted to pass light through said aperture to said photodetector; and the remaining ferrule being positioned outside said hollow cylinder and projecting to a location disposed laterally outwardly from the width dimension of the collar so as to be free of contact with the photodetector.

2. The combination of claim 1, including a stopper positioned generally between said collar and said photodetector, said annular stepped part disposed in surrounding relationship to said stopper, said stopper including an aperture along the common axis.

3. The combination of claim 1, wherein said plate-shaped collar, said annular stepped part and said elongate hollow cylinder directly connect said optical fiber connector to said photodetector without any adaptors cooperating between said photoreceptacle and said optical fiber connector.

4. The combination of claim 1, wherein said optical fiber connector includes a plug part which projects outwardly in surrounding but spaced relation with respect to said inserted ferrule, said plug part being telescoped over said hollow cylinder.

5. The combination of claim 1, wherein said hollow cylinder has a first diameter extending axially along a first part of the length of said hollow cylinder and includes a step having a second diameter, less than the first diameter extending axially along a second part of the length of said hollow cylinder toward the outwardly projecting end thereof, said cylindrical elastic body extending axially and secured to said hollow cylinder over the first part of the length of said hollow cylinder corresponding to the first diameter.

* * * * *